United States Patent
Kalay

(10) Patent No.: US 11,809,160 B2
(45) Date of Patent: Nov. 7, 2023

(54) MULTI-TOOLTIP CONTROL FOR COMPUTER-AIDED MANUFACTURING

(71) Applicant: Autodesk, Inc., San Francisco, CA (US)

(72) Inventor: Fikret Kalay, Saint-Jean-Bonnefonds (FR)

(73) Assignee: Autodesk, Inc., San Francisco, CA (US)

( * ) Notice: Subject to any disclaimer, the term of this patent is extended or adjusted under 35 U.S.C. 154(b) by 0 days.

(21) Appl. No.: 17/546,586

(22) Filed: Dec. 9, 2021

(65) Prior Publication Data

US 2023/0185273 A1 Jun. 15, 2023

(51) Int. Cl.
*G05B 19/4097* (2006.01)
*G05B 19/19* (2006.01)

(52) U.S. Cl.
CPC ......... *G05B 19/4097* (2013.01); *G05B 19/19* (2013.01); *G05B 2219/35134* (2013.01); *G05B 2219/39001* (2013.01)

(58) Field of Classification Search
CPC ............... G05B 19/4097; G05B 19/19; G05B 2219/35134; G05B 2219/39001
See application file for complete search history.

(56) References Cited

U.S. PATENT DOCUMENTS

| | | | |
|---|---|---|---|
| 8,033,811 B2 | 10/2011 | Swanson et al. | |
| 10,620,611 B2 | 4/2020 | Meess et al. | |
| 10,703,083 B2 | 7/2020 | Meess | |
| 11,207,826 B2 | 12/2021 | Ng et al. | |
| 2015/0039122 A1* | 2/2015 | Barakchi Fard | G05B 19/19 700/186 |
| 2018/0079009 A1* | 3/2018 | Fujii | B23B 3/26 |
| 2021/0086359 A1* | 3/2021 | Eberst | B25J 9/1666 |
| 2021/0096534 A1* | 4/2021 | Katsumoto | G05B 19/40938 |

* cited by examiner

*Primary Examiner* — Thomas C Lee
*Assistant Examiner* — Ameir Myers
(74) *Attorney, Agent, or Firm* — Fish & Richardson P.C.

(57) ABSTRACT

Methods, systems, and apparatus, including medium-encoded computer program products, for integrating control and operation of multi-tooltip processes with computer-aided manufacturing and/or design software and systems include method(s) including: obtaining toolpaths for manufacturing a physical structure and process control constraints, each of the toolpaths corresponding to a respective tooltip of a computer-controlled tool of a manufacturing system, each of the toolpaths designates a respective path for the respective tooltip within a workspace, and the process control constraints define capabilities of each of the respective tooltips within the workspace; defining a main toolpath and metadata defining operational parameters for the toolpaths based on the process control constraints; simulating manufacturing of the physical structure using the main toolpath and the metadata; and providing at least the main toolpath and the metadata for use in manufacturing the physical structure by the computer-controlled manufacturing system from the main toolpath and the metadata.

24 Claims, 7 Drawing Sheets

MULTI-TOOLTIP CONTROL FOR COMPUTER-AIDED MANUFACTURING

BACKGROUND

This specification relates to manufacturing of physical structures using additive and/or subtractive manufacturing systems and techniques.

Computer-aided design software and computer-aided manufacturing software has been developed and used to generate three-dimensional (3D) representations of parts and to manufacture the physical structures of those parts, e.g., using Computer Numerical Control (CNC) manufacturing techniques. Further, additive manufacturing, also known as solid free form fabrication or 3D printing, refers to any manufacturing process where 3D parts are built up from raw material (generally powders, liquids, suspensions, or molten solids) in a series of two-dimensional tiers or cross-sections. An example of additive manufacturing is Fused Filament Fabrication (FFF). A 3D extrusion printer typically uses FFF to lay down material, such as a plastic filament or metal wire, which is unwound from a coil, in tiers to produce a 3D printed part.

In addition, subtractive manufacturing refers to any manufacturing process where 3D parts are created from stock material (generally a "blank" or "workpiece" that is larger than the 3D part) by cutting away portions of the stock material. Such manufacturing processes typically involve the use of multiple CNC machine cutting tools in a series of operations, starting with a roughing operation, an optional semi-finishing operation, and a finishing operation. During roughing operation(s), large portions of the workpiece are cut away quickly (relative to semi-finishing and finishing operations) using cutting tool(s) of the CNC machining system in order to approximate the final shape of the part being manufactured. Moreover, hybrid manufacturing systems have been developed, where additive and subtractive manufacturing are combined, such as a CNC machine that combines laser metal deposition with high-precision 5-axes adaptive milling.

SUMMARY

This specification describes technologies relating to systems and methods for integrating control and operation of multi-tooltip processes with computer-aided manufacturing (CAM) and/or computer-aided design (CAD) software and systems. Process constraint(s) and behavior law(s) dictating the operation of each tooltip of the two or more tooltips as well as the interaction between the two or more tooltips are utilized to define a main toolpath and metadata for a computer-controlled tool including the two or more tooltips, e.g., multiple end effectors for a robotic arm, where the main toolpath and the metadata is provided as input to a CAM/CAD simulation environment and utilized to simulate the operation of the computer-controlled tool including the two or more tooltips relative to the main toolpath.

In general, one or more aspects of the subject matter described in this specification can be embodied in one or more methods that include: obtaining two or more toolpaths for manufacturing a physical structure and process control constraints, wherein each of the two or more toolpaths corresponds to a respective tooltip of two or more tooltips of a computer-controlled tool of a computer-controlled manufacturing system, each of the two or more toolpaths designates a respective path for the respective tooltip of the computer-controlled tool within a workspace of the computer-controlled manufacturing system, and the process control constraints define capabilities of each of the respective tooltips within the workspace of the computer-controlled manufacturing system; defining a main toolpath and metadata defining operational parameters for the two or more toolpaths corresponding to respective tooltips based on the process control constraints; simulating manufacturing of the physical structure by the computer-controlled tool using the main toolpath and the metadata; and providing, responsive to a completion of the simulating, at least the main toolpath and the metadata for use in manufacturing the physical structure by the computer-controlled manufacturing system from the main toolpath and the metadata.

The foregoing and other implementations can each optionally include one or more of the features described herein, alone or in combination. In particular, various implementations include one or more (or all) of the following features in combination. Providing the main toolpath and the metadata for use in manufacturing the physical structure by the computer-controlled manufacturing system can include: generating manufacturing machine instructions from the main toolpath and the metadata; and providing, to the computer-controlled manufacturing system, the manufacturing machine instructions.

Obtaining two or more toolpaths for manufacturing the physical structure can include generating the two or more toolpaths from a 3D model of the physical structure to be manufactured. Defining the main toolpath can include: selecting one of the two or more toolpaths to be the main toolpath based on the process control constraints for each of the tooltips and the physical structure to be manufactured, or generating the main toolpath based on the two or more toolpaths and the process control constraints for each of the tooltips and the physical structure to be manufactured.

Obtaining the process control constraints can include: obtaining, for each of the tooltips, one or more values defining starting/stopping rates, flow rates, or manufacturing rates of the tooltip. The metadata can define control information for motion of a tooltip relative to the computer-controlled tool and operation of the tooltip along the main toolpath and according to the one or more values defining starting/stopping rates, flow rates, or manufacturing rates of the tooltip. Defining the metadata can include, for at least one tooltip of the tooltips: assigning, to the tooltip, an initial location and orientation relative to a tool vector of the computer-controlled tool; and generating, for multiple locations along the main toolpath, one or more of a time shift, point shift, or layer shift for the tooltip relative to the main toolpath.

The computer-controlled tool can be a robotic arm, and the two or more tooltips can include two or more end effectors. The two or more toolpaths can include a first toolpath for a first tooltip and a second, phase-shifted toolpath for a second tooltip. At least a first portion of the first toolpath for the first tooltip can be different from a second portion of the second, phase-shifted toolpath for the second tooltip. Obtaining two or more toolpaths for manufacturing a physical structure can include obtaining a third toolpath for a third tooltip, wherein the third toolpath is in a fixed position with respect to the main toolpath of the computer-controlled tool.

Moreover, one or more aspects of the subject matter described in this specification can be embodied in one or more systems that include a data processing apparatus including at least one hardware processor and a non-transitory computer-readable medium encoding instructions of a computer-aided design or manufacturing program. Thus, as will be appreciated, the non-transitory, computer-readable medium can encode instructions configured to cause the data processing apparatus to perform the one or more methods, as detailed above and herein. Moreover, the system can include the computer-controlled manufacturing system.

Particular embodiments of the subject matter described in this specification can be implemented to realize one or more of the following advantages. Control of multiple tooltips simultaneously along a main toolpath can increase functionality of a computer-aided manufacturing system, allowing for multiple simultaneous processes to be performed in a workspace, e.g., multiple additive manufacturing processes, multiple subtractive manufacturing processes, or a combination thereof. An automated sub-workflow can be generated to define a main toolpath and metadata (i.e., control signals) for a computer-controlled tool including multiple end effectors based on process control constraints for controlling individual motion and operation of the multiple end effectors, e.g., each tooltip of two or more tooltips, where the sub-workflow including the main toolpath and metadata is integrated with existing CAM workflow as a standard one tooltip/one toolpath operation. The sub-workflow can include control signals to operate two or more tooltips performing similar or different operations simultaneously along similar or different toolpaths, and/or to perform asynchronous operations (e.g., preheating and printing).

In some embodiments, the sub-workflow can be adapted to various types of manufacturing processes, where different types of manufacturing processes can include respective limitations versus flexibilities in both path and operation of the tooltips. An output of the sub-workflow process can be provided as input to an existing CAD/CAM simulation such that a same CAD/CAM simulation can be utilized to determine if a physical object can be manufactured, e.g., for a new manufacturing system configuration, without requiring substantial re-writing of the simulation software for a particular configuration of the multiple end effectors in a manufacturing system. This can streamline the design and manufacturing processes, and reduce the need for costly code restructuring/debugging for each new manufacturing system configuration. Moreover, the workflow approach allows new, not-native features to be readily implementation in a CAM system, such as better management of the temporal aspects of processes, which are dependent on time (e.g., drying time, expansion time, etc.) and management of a phase shift between tooltips.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Additive manufacturing (AM) systems, subtractive manufacturing (SM) systems, and hybrid AM/SM systems including computer-controlled tools having multiple (e.g., at least two) tooltips capable of performing parallel or asynchronous operations can accelerate a speed of manufacturing, increase yield, streamline processes previous performed by different systems in series, and the like. In general, simulation software used in a CAD/CAM simulation environment to determine if a physical product may be manufactured using a particular AM, SM, or hybrid manufacturing system, can model a single toolpath by a single computer-controlled tool (or multiple sequential toolpaths by respective computer-controlled tools), and thus may not be compatible with a multi-tooltip, multiple toolpath manufacturing system configured to perform multiple parallel operations and/or asynchronous (i.e., phase-shifted) operations without modification to the CAD/CAM simulation environment.

Described in this specification is a multi-tooltip system for adapting multiple toolpath, multiple tooltip configurations corresponding to various AM, SM, or hybrid AM/SM systems to be compatible with a single toolpath, single computer-controlled tool CAM/CAD simulation environment. For a given multiple toolpath, multiple tooltip configuration of a manufacturing system, the multi-tooltip system can generate, based on behavior laws particular to the multiple toolpath, multiple tooltip configuration of the manufacturing system, a main toolpath and metadata for operating a computer-controlled tool to provide as input to the CAM/CAD simulation environment. The CAM/CAD simulation environment may then perform operations such as determining whether a physical object may be manufactured utilizing the main toolpath for the computer-controlled tool, and further generate manufacturing instructions for the manufacturing system from the main toolpath and metadata for the computer-controlled tool.

Figure 1A:
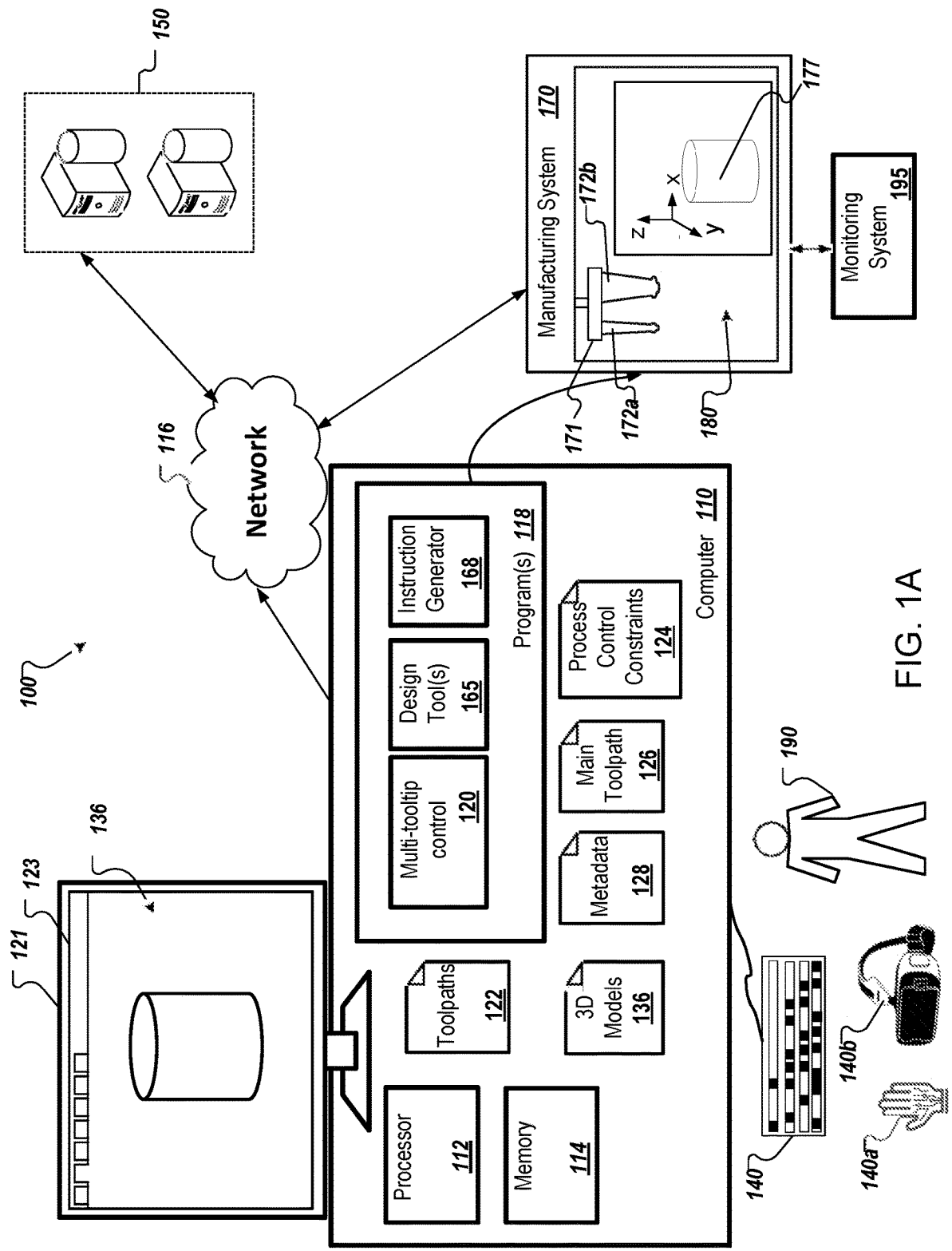
FIG. 1A shows an example of a system usable to design and manufacture physical structures.

FIG. 1A shows an example of a multi-tooltip system 100 for designing and manufacture physical structures. A computer 110 includes a processor 112 and a memory 114, and the computer 110 can be connected to a network 116, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112.

Program(s) 118 for performing operations related to Computer Aided Manufacturing (CAM), e.g., programs to perform one or more three-dimensional (3D) modeling, simulation (finite element analysis or other) and manufacturing control, can include, for example, Computer Aided Design (CAD) and/or Computer Aided Engineering (CAE) programs, etc. A user 190 can interact with the program(s) 118 to create and/or load 3D models 136 of parts to be manufactured using a manufacturing system 170, such as a subtractive manufacturing (SM) system, (e.g., multi-axis, multi-tool milling machine such as a Computer Numerical Control (CNC) machine), an additive manufacturing (AM) system, or a hybrid AM and SM system. Examples of AM, SM and hybrid systems include systems that use additive granular techniques (e.g., Powder Bed Fusion (PBF), Selective Laser Sintering (SLS) and Direct Metal Laser Sintering (DMLS)) or extrusion techniques (e.g., Fused Filament Fabrication (FFF), metals deposition), and/or subtractive milling techniques, electrode discharge, chemical machining, waterjet cutting, laser cleaning and welding, etc.

In some implementations, program(s) 118 can be utilized to generate multiple toolpaths, for example, two or more toolpaths corresponding to respective tooltips (e.g., tooltips 172a, 172b) of a computer-controlled tool 171, from a 3D model 136 of a part to be manufactured using a manufacturing system 170 that includes a computer-controlled tool having the multiple tooltips. In some implementations, a user may provide to the system 100 multiple toolpaths corresponding to respective tooltips for manufacturing a part using manufacturing system 170 that includes multiple tooltips. In some implementations, the program(s) 118 generate the multiple toolpaths corresponding to respective tooltips based on the 3D model 136.

Program(s) 118 additionally include a multi-tooltip control program 120. The multi-tooltip control program 120 can be configured to perform operations including receiving multiple (e.g., two or more) toolpaths 122 corresponding to respective tooltips for manufacturing a part on manufacturing system 170 including a computer-controlled tool 171 having multiple tooltips. The multi-tooltip control program 120 can receive (e.g., stored/programmed therein) process control constraints 124 of a manufacturing system 170, where process control constraints 124 for the manufacturing system 170 include information related to the operation of manufacturing system 170 and in particular, the manufacturing components, for example, tooltip geometry and orientation, dynamic feed-rate, start/stop parameters, or other constraints. Additionally, process control constraints 124 can define relationships (i.e., behavioral law) between multiple tooltips of the computer-controlled tool of the manufacturing system 170, i.e., how the various tooltips interact with each other, relative fixed or variable positioning of the tooltips with respect to each other, etc. Process control constraints 124 additionally may include information related to a working envelope within a workspace 180 of the manufacturing system 170, where the working envelope defines the range of motion and orientation through the range of motion of each of the tooltips of the computer-controlled tool 171 of the manufacturing system 170.

The multi-tooltip control program 120 can receive the multiple toolpaths 122 and the process control constraints 124, and generate a main toolpath 126 and metadata 128 for a computer-controlled tool 171 including multiple tooltips 172a, 172b of a manufacturing system 170 as output. The output of the multi-tooltip control program 120 can be provided as input to one or more other programs 118, e.g., a CAD/CAM simulation program. Further details related to the operations of multi-tooltip control program 120 are described with reference to FIGS. 2-4 below.

Program(s) 118 can run locally on computer 110, remotely on a computer of one or more remote computer systems 150, (e.g., one or more third party providers' one or more server systems accessible by the computer 110 via the network 116) or both, locally and remotely. The program(s) 118 can be computer programs having implemented logic for designing 3D models for parts to be machined from a workpiece and/or parts to be manufactured by additive manufacturing.

Program(s) 118 can present a user interface (UI) 123 on a display device 121 of the computer 110, which can be operated using one or more input devices 140 of the computer 110, e.g., keyboard and mouse. A user 190 can interact with the program(s) 118 via the user interface 123, for example, to provide a 3D model 136 of a part to be manufactured, to input process control constraints 124 and/or toolpaths 122 for manufacturing the part on the manufacturing system 170, and the like.

Note that while shown as separate devices in FIG. 1A, the display device 121 and/or input devices 140 can also be integrated with each other and/or with the computer 110, such as in a tablet computer or in a virtual reality (VR) or augmented reality (AR) system. For example, the input/output devices 140 can include a VR input glove 140a and a VR headset 140b.

In some implementations, program(s) 118 are associated with creating and storing 3D models 136 for manufacturing systems, e.g., CNC manufacturing systems, through utilization of design tools 165 provided to the user 190, e.g., through user interface 123. This can be done using known graphical user interface tools, and the 3D models 136 can be defined in the computer using various known 3D modeling formats, such as solid models or surface models (e.g., B-Rep (Boundary Representation (B-Rep)) and surface meshes). In addition, the user 190 can interact with the program(s) 118 to modify the 3D model 136 of the part, as needed.

In some implementations, program(s) 118 can include an instruction generator 168 that generates instructions in relation to performing multiple manufacturing processes by the manufacturing system 170 using the main toolpath 126 and tooltip metadata 128. For example, instruction generator 168 can generate a set of G-code instructions to manufacture a part using manufacturing system 170 based on the main toolpath 126 and metadata 128 for a computer-controlled tool 171 including multiple tooltips.

In some implementations, a manufacturing system, such as the manufacturing system 170, can include powerful and highly accurate computer-controlled tool 171 having multiple (i.e., two or more) tooltips that perform repeated and precise movements to perform subtractive manufacturing and/or additive manufacturing. For example, manufacturing system 170 can be a hybrid CNC machine that performs both subtractive and additive manufacturing. The manufacturing system 170 can receive computer-generated code and convert it into electronic signals based on implemented logic at the CNC machine to reproduce movements by some machine components based on the received instructions. Instructions received at the CNC machine in relation to performing surface inspection, part alignment, and/or machining a part may be defined in terms of defining machine tool and/or probe motions, working bed (table) motions, or both.

Manufacturing system 170 includes a computer-controlled tool 171 having multiple manufacturing components 172a, 172b (e.g., end effectors, tooltips) which can be used to perform subtractive and/or additive manufacturing processes on a part 177 in the workspace 180. A tooltip 172a, 172b can include, for example, extruders for various materials (e.g., concrete, foam, ceramic, metals, polymers, fiber reinforced polymers (FRP), etc.), milling tools (e.g., for a CNC milling machine), tools for generating localized heating and/or abrasion (e.g., laser-based tools, including laser cleaning, thermal guns, chemical bonding heads, waterjet and laser cutting, etc.), and the like.

Figure 1B:
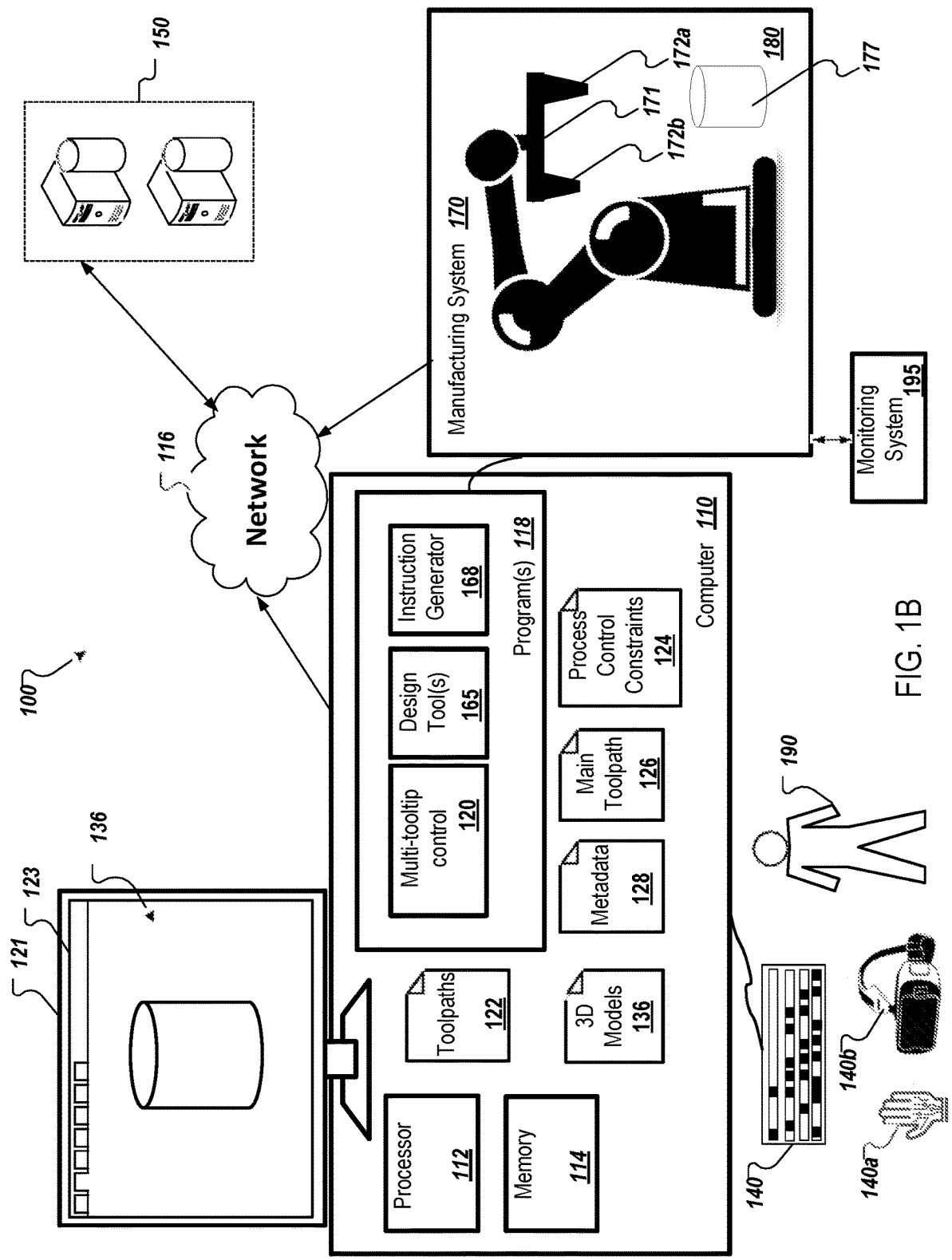
FIG. 1B shows another example of a system usable to design and manufacture physical structures.

Manufacturing system 170 can be, as depicted in FIG. 1B, a robotic-based manufacturing system including a computer-controlled tool 171 (e.g., a robotic arm) having two or more independently-controllable end effectors. In some implementations, manufacturing system 170 can include two or more tooltips 172a, 172b including two or more foam extruders for performing a layer-by-layer additive manufacturing process to form a foam mold, and a concrete extruder for pouring concrete into the formed foam mold. In another example, manufacturing system 170 can include a computer-controlled tool 171 having two or more tooltips 172a, 172b including a pre-heating tooltip (e.g., for pre-heating a powder bed or an existing workpiece) and an additive manufacturing tooltip (e.g., a laser source, light source, or other AM tooltip), where the toolpath of the additive manufacturing tooltip can be phase-shifted and/or layer shifted from the pre-heating tooltip.

Manufacturing system 170 includes workspace 180, where the workspace 180 is configured to retain a part 177 within the manufacturing system 170. Workspace 180 can include a platform and one or more fixtures to retain and affix a part 177 during a manufacturing process. In some implementations, workspace 180 may be configured to retain a liquid and/or powder bed (e.g., in a case of an AM system or hybrid AM/SM system), where a part 177 is formed within the liquid and/or powder bed, e.g., via selective laser sintering, UV curing, etc. In some implementations, the workspace 180 is re-definable by moving the manufacturing system 170. For example, the manufacturing system 170 can be robot that is mobile and can reposition itself in the environment, as needed.

Manufacturing system 170 can include a monitoring system 195 configured to monitor processes of the manufacturing system 170, for example, the system can store log data for the execution of the operations of the system 170, where such log data may include metadata about the time of execution, positioning of the components, executed movements, configurations on the machine when the manufacturing is performed, among other items.

As depicted in FIGS. 1A and 1B, a 3D model 136 is a model of a particular part 177 or a portion of a part, for example, a connector for attachment of manufactured parts into a larger system or machine. In some examples, 3D model 136 can be a model of other parts such as a circuit board, a tool part, jewelry, among others. Many different types of models can be used with the systems and techniques described herein. In any case, the 3D model 136 can be used to generate a set of computer numerical control (CNC) instructions, e.g., G-code (also referred to as RS-274) instructions, for use by the manufacturing system 170 to manufacture the part. For example, the 3D model 136 can be used to generate a main toolpath 126 including metadata 128 for a computer-controlled tool 171 having the multiple tooltips, which in turn can be utilized to generate G-code instructions that can be sent to the manufacturing system 170 and used to control operation of the computer-controlled tool 171 having the two or more tooltips 172a, 172b along respective toolpaths to manufacture part 177. The program(s) 118 can include an instruction generator 168 that generates instructions in relation to performing multiple manufacturing processes by the manufacturing system 170 using the main toolpath 126 and tooltip metadata 128.

In some implementations, instructions for manufacturing a part using manufacturing system 170 can be generated based on an input provided by the user 190, or in light of the user's request for another action, such as sending the 3D model 136 to the manufacturing system 170, or other manufacturing machinery, which can be directly connected to the computer 110, or connected via a network 116, as shown. This can involve a post-process carried out on the local computer 110, or a cloud service, to export the 3D model 136 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files. The document may also include data for positioning for the machining, including an initial position for the workpiece, and other positions during the machining, for example, in relation to different setups defined for machining the part.

Figure 1C:
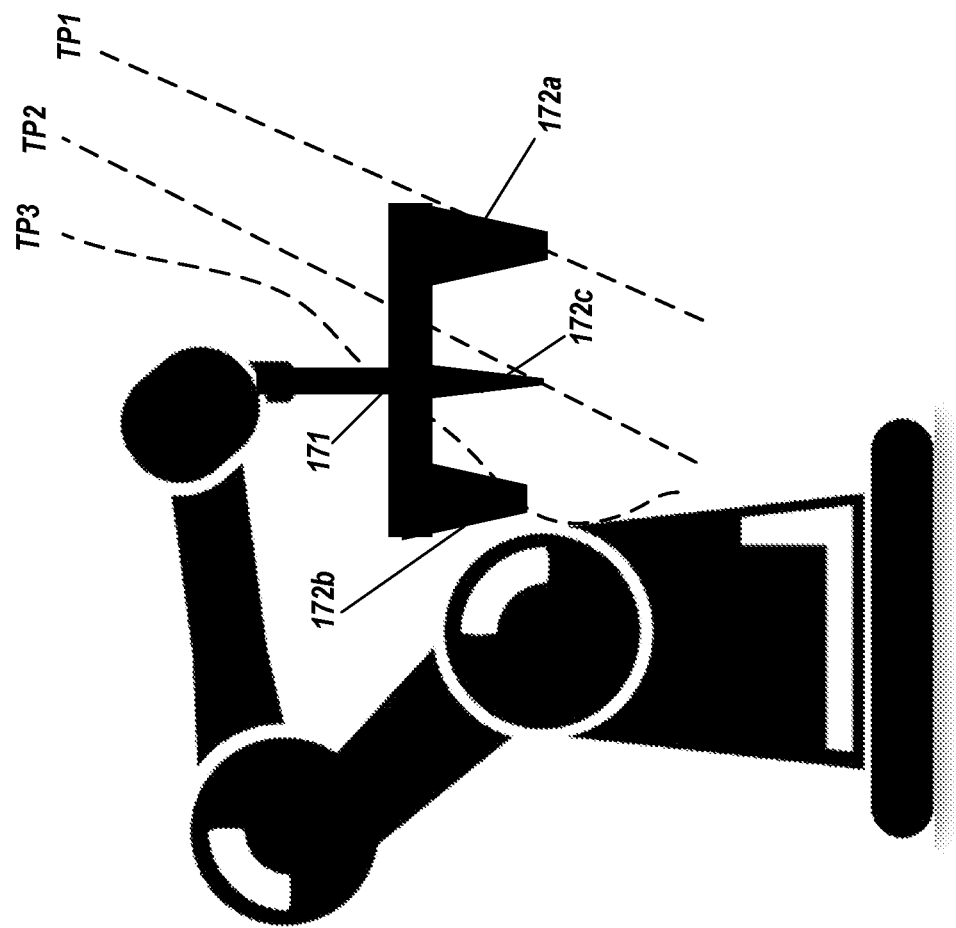
FIG. 1C shows an example of a manufacturing system including multiple tooltips.

FIG. 1C shows an example of a manufacturing system including multiple tooltips. As depicted, manufacturing system 170 is a robotic manufacturing system and includes three end effectors, e.g., tooltips 172a, 172b, and 172c, on a computer-controlled tool 171. Each of the tooltips 172a, 172b, and 172 has a respective toolpath: toolpath 1 (TP1), toolpath 2 (TP2), and toolpath 3 (TP3) that the tooltip follows during the process of manufacturing a part, and which may be generated based on the 3D model 136 of the part. For example, the tooltips 172a, 172b can be foam extruders that build a form into which a concrete extruder 172c dispenses concrete to build a structure. Each of TP1, TP2, and TP3 can trace a different spatial path with respect to a workspace of the manufacturing system 170, where the respective tooltips can perform a same or different operation as each other tooltip of the computer-controlled tool. As described in further detail below with reference to FIGS. 2-4, operation of the tooltips along the respective toolpaths can be asynchronous, such that each tooltip on a given toolpath can include one or more of a phase shift, point shift, time shift, layer shift, etc., with respect to one or more other tooltips on respective toolpaths.

Figure 2:
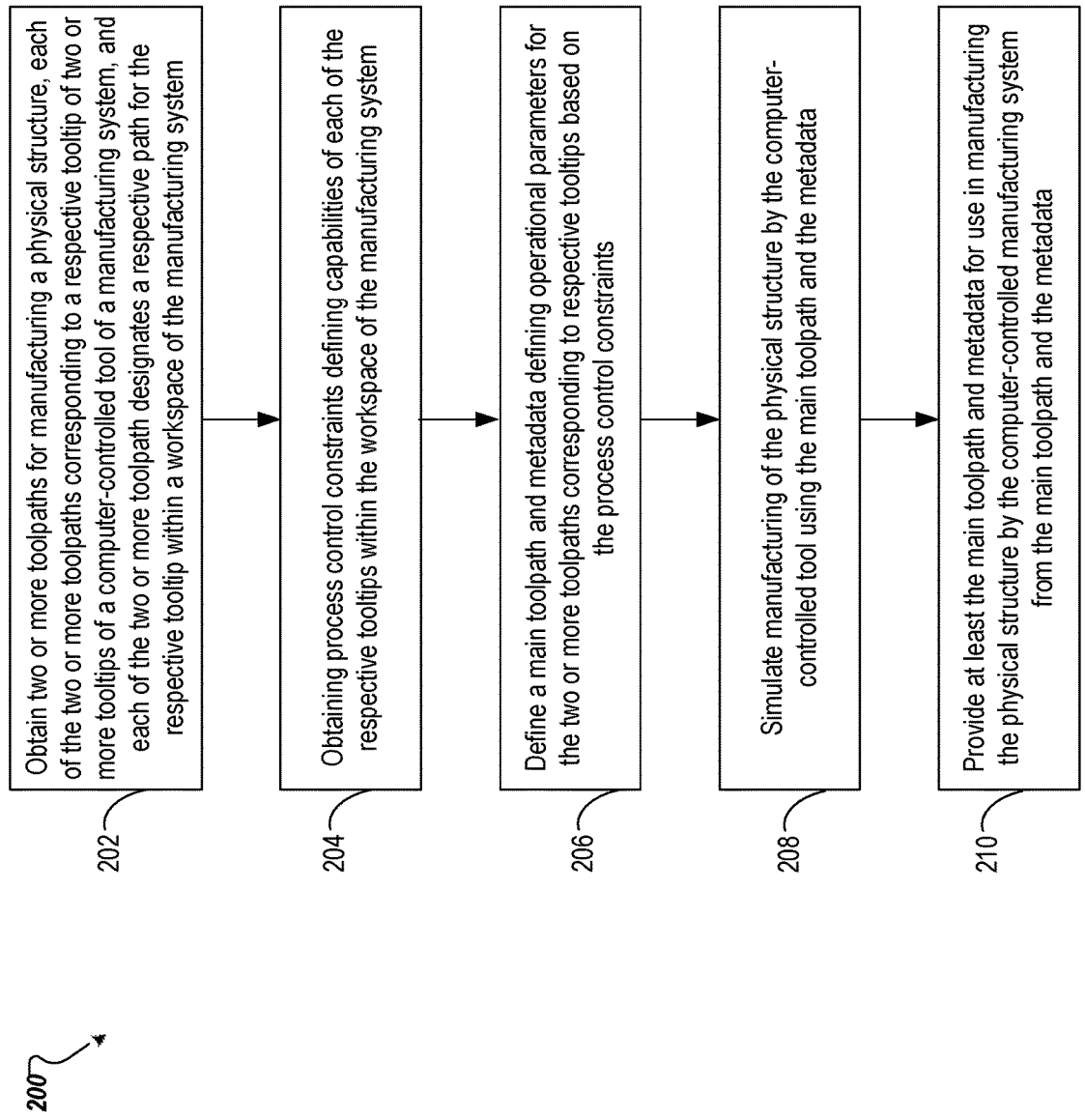
FIG. 2 shows an example of a process of defining a main toolpath for the control and operation of a multi-tooltip computer-controlled tool.

FIG. 2 shows an example of a process 200 for a multi-tooltip system as described with respect to FIGS. 1A, 1B, and 1C. In some embodiments, the processes of FIGS. 2, 3, and 4 can be implemented as part of a computer-aided design program and/or computer-aided manufacturing program 118 running in relation to a computer-controlled manufacturing system 170 for manufacturing parts of different material and shape. In some embodiments, the processes of FIGS. 2, 3, and 4 can be executed outside of a CAD/CAM program, at a separate program including implemented logic for main toolpath generation, e.g., by a multi-tooltip control program 120. The process output can be fed into such a CAD/CAM program 118 or directly provided to a computer-controlled manufacturing system 170 for measuring and/or manufacturing parts, such as the manufacturing system 170 of FIGS. 1A, 1B.

The system obtains multiple toolpaths, e.g., two or more toolpaths, for manufacturing a physical structure, each of the two or more toolpaths corresponding to a respective tooltip of two or more tooltips of a computer-controlled tool 171 of a computer-controlled manufacturing system, and each of the two or more toolpaths designating a respective path for the respective tooltip within a workspace of the manufacturing system (202). Each of the two or more toolpaths (e.g., toolpaths TP1 and TP3, or TP1 and TP2, or TP1, TP2, and TP3) designates a toolpath for respective tooltips (e.g., tooltips 172a, 172b, and 172c depicted in FIG. 1C).

In some implementations, obtaining the two or more toolpaths includes generating by the system 100 the two or more toolpaths from a 3D model, e.g., 3D model 136, of the physical structure to be manufactured. The two or more toolpaths can be generated, for example, using CAD/CAM program(s) 118 from a 3D model that is provided to the system 100 and/or generated using design tools 165. A user 190 may generate a 3D model of a part/structure to be manufactured via user interface 123 of the system 100.

The system obtains process control constraints that define capabilities of each of the respective tooltips of the computer-controlled tool corresponding to the two or more toolpaths with respect to each other tooltip of the computer-controlled tool within the workspace of the computer-controlled manufacturing system (204). Process control constraints for each of the tooltips 172a, 172b of the computer-controlled tool 171 within the workspace 180 of the manufacturing system 170 can include values defining start/stop rates for the tooltip (e.g., velocity, acceleration/deceleration rates, etc.), flow rates (e.g., for an extruder-type tooltip), or machining rates of the tooltip.

In some implementations, a computer-controlled tool is a robotic arm including two or more end effectors. The computer-controlled tool 171 can include multiple end effectors, e.g., tooltips 172a, 172b, 172c, that can be in fixed orientations with respect to each other or have variable orientations with respect to each other. Each of the end effectors can perform a different or a same operation/function during a manufacturing process of a physical part/structure along its respective toolpath. Each of the multiple end effectors can be related to each other end effector by behavior laws which dictate operation/function of the end effectors with respect to each other and with respect to the workspace 180 of the manufacturing system 170. For example, a first end effector can be a foam extruder, and a second end effector can be a concrete extruder, where the first end effector is fabricating a foam shell which is filled by concrete by the second end effector. Each end effector can have a set of process control constraints, e.g., flow rates for the various materials being extruded by each end effector, and behavior laws that dictate operation of the end effectors with respect to each other, e.g., an amount of time delay for the foam to dry after being deposited before concrete can be flowed into the foam shell.

The system defines a main toolpath and metadata defining operational parameters for the two or more toolpaths corresponding to respective tooltips based on the process control constraints (206). In some implementations, defining the main toolpath involves selecting one of the two or more toolpaths to be the main toolpath based on the process control constraints for each of the tooltips and the physical structure to be manufactured. In other words, the multi-tooltip control program 120 may designate a particular toolpath (i.e., a "master" toolpath) of the two or more toolpaths to be the main toolpath 126, and then generate metadata 128 defining the operational parameters of the other tooltip(s) for respective toolpath(s) of the two or more other toolpaths (i.e., "slave" toolpaths) with respect to the main toolpath 126. In some implementations, the multi-tooltip control program 120 defines the main toolpath by generating the main toolpath 126 based on the one of the two or more toolpaths and the process control constraints for each of the tooltips and the physical structure to be manufactured.

In some implementations, the two or more toolpaths include a first toolpath for a first tooltip and a second, phase-shifted toolpath for a second tooltip. For example, a first tooltip is a pre-heating tooltip that traces a toolpath along a powder bed to pre-heat powder to be sintered in an additive manufacturing process, and a second tooltip is a laser source that traces the toolpath at a phase-shift, e.g., at a time-delay, to sinter the pre-heated powder. In another example, a first tooltip is an extruder depositing a material along a first toolpath and a second tooltip is an extruder depositing the material along a second, spatially shifted toolpath (e.g., displaced by an offset from the first toolpath).

In some implementations, the multiple toolpaths include at least three toolpaths, where a third toolpath is in a fixed position with respect to the main toolpath of the computer-controlled tool. For example, the third toolpath may be aligned with the main toolpath such that the main toolpath is defined by the third toolpath, e.g., the third toolpath can be equivalent to the main toolpath and can be used for a concrete extruder, and first and second toolpaths can be used with first and second foam extruders, where the first and second toolpaths are defined in relation to the third/main toolpath for the concrete extruder. In another example, each location along the third toolpath may be defined with respect to the main toolpath by an offset distance, where the offset distance is a fixed amount.

In some implementations, metadata that defines operational parameters for the tooltips based on the process control constraints includes a set of control signals to control the motion and operation of each of the tooltips relative to the computer-controlled tool and according to the one or more process control constraints for the tooltip.

In some implementations, metadata that defines operational parameters for the tooltips based on the process control constraints includes metadata for multiple locations along the main toolpath for the computer-controlled tool. At each location along the main toolpath and for a given tooltip of the multiple tooltips, an initial location and orientation relative to a tool vector of the computer-controlled tool is assigned to the respective tooltip. For the multiple locations along the main toolpath, the multi-tool control program generates one or more of a time shift, point shift, or layer shift for the given tooltip relative to the main toolpath. In implementations where a main toolpath is defined as one of the two or more toolpaths, the corresponding tooltip does not include a time shift, point shift, or layer shift relative to the main toolpath.

The system 100, e.g., using a CAD/CAM simulation program, simulates, manufacturing of the physical structure by the computer-controlled tool using the main toolpath and the metadata (i.e., as a single toolpath, single tooltip configuration) (208). A CAD/CAM simulation program can receive the main toolpath and metadata from the multi-tooltip control program 120 as input and perform analysis in the simulation environment to determine whether the physical object can be manufactured by the manufacturing system 170 as designed. In response to the CAD/CAM simulation program determining, from the main toolpath and metadata, that the physical part can be manufactured by the manufacturing system 170 as designed, the system 100 can proceed with providing the main toolpath and metadata for use in manufacturing the physical structure using the manufacturing system 170.

The system provides the main toolpath and metadata for use in manufacturing the physical structure by the computer-controlled manufacturing system from the main toolpath and metadata (210). In some implementations, providing the main toolpath and metadata for use in manufacturing the physical structure includes generating manufacturing machine instructions by instruction generator 168, e.g., G-code instructions, from the main toolpath and the metadata and providing the manufacturing machine instructions to the computer-controlled manufacturing system to manufacturing the physical structure.

Figure 3:
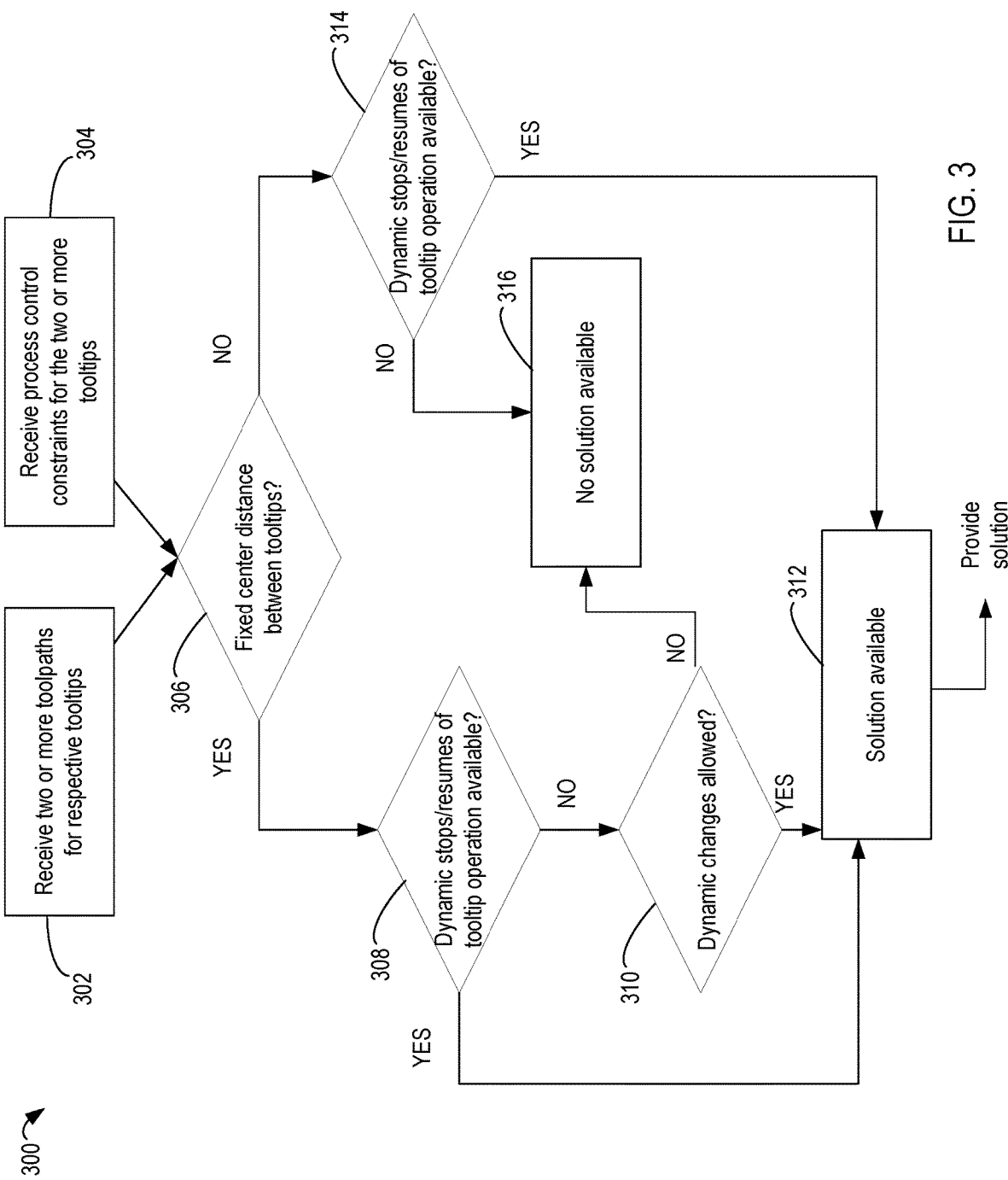
FIG. 3 shows another example of a process of defining a main toolpath for the control and operation of a multi-tooltip computer-controlled tool.

FIG. 3 is flow chart of an example of a process 300 for a multi-tooltip system. As described with reference to the process of FIG. 3, the multi-tooltip system 100 receives a set of n-toolpaths (e.g., two or more toolpaths) for a set of n-tooltips (e.g., two or more tooltips) as input and provides a main toolpath for a computer-controlled tool as output.

The system receives, as input, two or more toolpaths 122 for respective tooltips of two or more tooltips 172a, 172b (302). Additionally, the system can receive process control constraints for the two or more tooltips (304). Each toolpath for a respective tooltip includes a set of initial conditions. The initial conditions of the toolpath can include spatial coordinates (e.g., Cartesian coordinates) of each point along the toolpath, as well as an initial vector (e.g., an IJK vector) for a tool at each point along the toolpath representing the tool vector on which the tooltip will be attached.

In some implementations, the two or more toolpaths can be received by the system as input from another process, e.g., from a CAD/CAM simulation process. In some implementations, the two or more toolpaths can be generated from a 3D model 136 of a physical structure to be manufactured.

Process control constraints 124 for each tooltip can include one or more process parameters for the tooltip at each point along the initial toolpath. Process control constraints can include, for example, feed rate, process on/off, linear speed and/or acceleration between each point along the initial path. Types of process control constraints can depend in part on the manufacturing system, the tooltip type, and the manufacturing process being performed (i.e., additive and/or subtractive manufacturing processes). For example, an additive manufacturing process performed can include process control constraints for extruder on/off controls. In another example, a laser cutting process can include process control constraints for laser on/off controls. In yet another example, a subtractive manufacturing process can include process control constraints for spindle on/off controls.

In some implementations, process control constraints can be received as input from another process, either separately or along with the toolpaths, or loaded from non-volatile memory when behavior law is specified in the CAD/CAM program.

In some implementations, the two or more toolpaths can be generated in view of the process control constraints, which in turn can be selected from a set of different process control constraints defined for different manufacturing systems, e.g., different additive, subtractive, or hybrid additive-subtracting manufacturing systems.

In some implementations, process control constraints include materials utilized in the manufacturing process, e.g., additive or subtractive processes. For example, materials of manufacture can be associated with flow rates of the material, thermal response of the material, cure rates of the material, or the like (e.g., in the case of additive manufacturing processes). In another example, materials can be associated with machining speed/acceleration, e.g., based on hardness of the material, for subtractive manufacturing processes.

In some implementations, process control constraints include degrees of freedom, range of motion, etc., of the tooltips corresponding to each toolpath of the two or more toolpaths. For example, process control constraints can describe limits of the range of motion of a tooltip within a workspace 180 of a particular manufacturing system 170.

In some implementations, a user can input user parameters for the process parameters, where the user parameters can define flexibility in the process parameters, e.g., based on a type of manufacturing process. For example, a subtractive manufacturing process can allow for a feed rate adjustment within a specific range, such that a user can provide user parameters defining the adjustment within the specific range. This is in contrast to an additive manufacturing process in which, if the extrusion is not speed-controlled, then slowing down the feed rate means adding more material than expected.

An initial configuration for each tooltip can be defined where each tooltip of the two or more tooltips can be assigned an initial toolpath and a respective first point along the initial toolpath. In some implementations, a user may define the initial configuration for each tooltip including an orientation of the tooltip, e.g., the tool vector for the tooltip. In some implementations, the program(s) 118 define the initial configuration for each tooltip.

In some implementations, process control constraints can include defining asynchronous processes as input to the system. Asynchronous processes, e.g., time shifted processes, point shifted processes, layer shifted processes, or the like, can be provided as additional process control constraints for the two or more tooltips.

In some implementations, a user may define a different toolpath for one of the two or more tooltips and further define a particular asynchronous process, e.g., a phase shift, point shift, time shift, etc., for the different toolpath. In one example, a user can define an asynchronous process between tooltips on different, respective toolpaths (e.g., a phase shift between two tooltips on two different toolpaths). In another example, a user can define an asynchronous process between tooltips on a same toolpath (e.g., a phase shift between two tooltips on a same toolpath).

In some implementations, an asynchronous process can include a point (i.e., a location) shift, i.e., a number of points along a first toolpath for a first tooltip on the first toolpath to travel before activating a second tooltip, e.g., before activating the second tooltip along the first toolpath or a second, different toolpath. In some implementations, an asynchronous process can be implemented as a layer shift, i.e., where a first tooltip on a first toolpath completes a layer (e.g., for an additive manufacturing process) before a second tooltip is activated along the same first toolpath or along a second, different toolpath.

In some implementations, defining process control constraints includes defining two or more asynchronous processes for two or more tooltips. For example, process control constraints can include a point shift and a layer shift between two tooltips along respective toolpaths. The system can determine if a fixed center distance exists between the two or more tooltips (306). In some implementation, defining whether or not a fixed center distance exists can be done by a user.

In response to determining that a fixed center distance exists between the two or more tooltips, the system determines, based on the input process control constraints for the two or more tooltips, whether dynamic stops/resumes of tooltip operation is available for each of the two or more tooltips (308).

In response to determining, by the system, that dynamic stops/resumes of tooltip operation for a fixed center distance case is not available, the system determines whether dynamic changes (e.g., dynamic feed-rate changes for an AM process) are allowed, e.g., based on the input process control constraints (310). Dynamic changes can include, for example, a dynamic feed-rate for an additive manufacturing process. In other words, changes to process control constraints that can be made within a threshold adjustment to outcome, e.g., product quality, end-product results. For example, an adjustment to how fast an additive manufacturing process is occurring while maintaining a threshold metric of quality for an end product being manufactured. A user can provide available dynamic changes for the process control constraints of the tooltips corresponding to the two or more toolpaths, e.g., based on desired outcome, threshold of quality metrics, or the like.

In response to determining, by the system, at (308) that dynamic stops/resumes of tooltip operation or at (310) that dynamic changes are allowed, the system can proceed to determine that a solution is available (312). As used here, a determination by the system that a solution is available includes defining a main toolpath and metadata defining operational parameters for the two or more tooltips based on the process control constraints for the two or more toolpaths and respective tooltips.

Referring back to (306), in response to determining that a fixed center distance does not exist between the two or more tooltips, the system determines, based on the input process control constraints for the two or more tooltips, whether dynamic stops/resumes of tooltip operation is available for each of the two or more tooltips (314). In response to determining, in (314), that dynamic stops/resumes of tooltip operation is available, the system can proceed to determine that a solution is available (312).

In response to the determination at (314) that dynamic stops/resumes of tooltip operation are determined by the system to not exist, or in response to the determination in (310) that dynamic changes are not allowed, the system determines that no solution is available (316). As used here, an instance in which no solution is available refers to when a main toolpath and metadata defining operational parameters for the two or more tooltips based on the process control constraints for the two or more toolpaths and respective tooltips cannot be defined. In such cases, an alert can be provided to the user, and a new approach to the initial toolpaths can be pursued.

Referring back to (312), in the instance where a solution is determined by the system to be available, the defined main toolpath for a computer-controlled tool including metadata defining operational parameters for the two or more tooltips based on the process control constraints for the two or more toolpaths and respective tooltips is provided, as output, by the system 100, e.g., to a CAD/CAM simulation program.

In some implementations, defining the main toolpath includes selecting one of the two or more toolpaths to be the main toolpath based on the process control constraints and the specific structure to be manufactured. In other words, The system can determine that an available solution 312 for a main toolpath for a computer-controlled tool defining the multiple tooltips is one of the two or more toolpaths input at (302).

Figure 4:
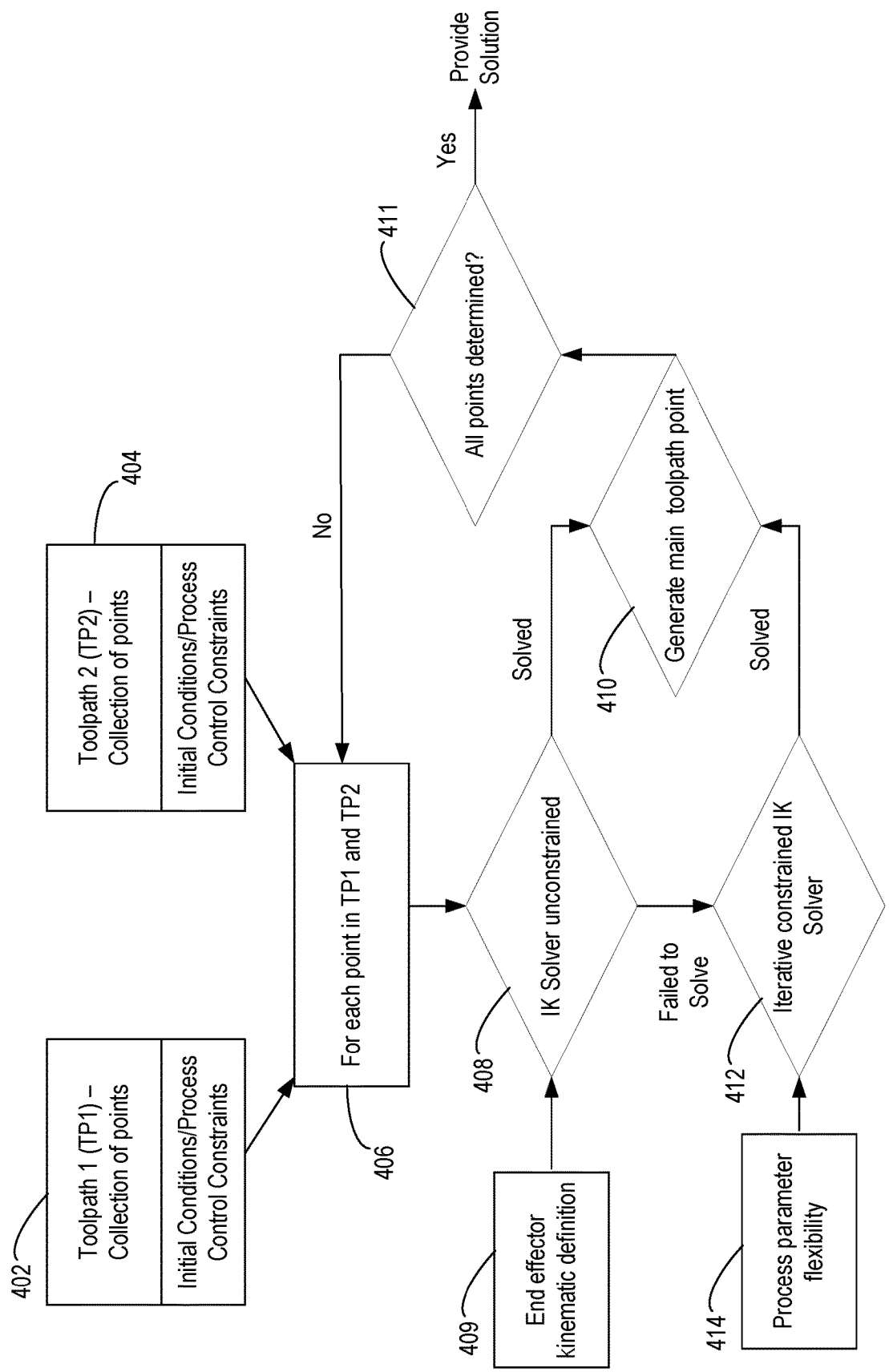
FIG. 4 shows another example of a process of defining a main toolpath for the control and operation of a multi-tooltip computer-controlled tool.

FIG. 4 is flow chart of another example of a process 400 for a multi-tooltip system. As described with reference to FIG. 4, an iterative process can be utilized by the system to determine an available solution, e.g., a main toolpath including multiple points along the main toolpath for a computer-controlled tool for an input set of toolpaths and respective tooltips. Though described with reference to FIG. 4 in terms of two toolpaths, e.g., toolpath 1 (TP1) and toolpath 2 (TP2), the process described can be applied to three or more toolpaths.

The system receives TP1 including a collection of points along TP1 and initial conditions and process control constraints for a first tooltip (402). The system receives TP2 including a collection of points along TP2 and initial conditions and process control constraints for a second tooltip (404). The initial conditions of the toolpath can include spatial coordinates (e.g., Cartesian coordinates) of each point along the respective toolpaths, as well as an initial vector (e.g., an IJK vector) for a tool at each point along the respective toolpath representing the tool vector on which the tooltip will be attached. The process control constraints can be defined with respect to each toolpath and corresponding tooltip. In some implementations, the process control constraints can be defined with respect to the multiple tooltips, the manufacturing process, and/or a manufacturing system.

For each point in the respective toolpaths TP1 and TP2 (406), the system determines if the inverse kinematic (IK) solution that is unconstrained is available (408). In some implementations, an IK Solver can be utilized to create an inverse kinematic solution to rotate and position links in a chain, e.g., the linked points along the respective toolpaths TP1 and TP2. For each tooltip, e.g., end effector, of the tooltips corresponding to the two or more toolpaths (e.g., TP1 and TP2), kinematic definitions can be provided to the IK Solver (409). In some cases, the kinematic definitions can be the same as the process control constraints (or make not changes with respect to the process control constraints, or not be used) but note that TP1 and TP2 are still synchronized with the time, as the distance between points in TP1 and TP2 can be different. The consequence of this is that an intermediate point either in TP1 or in TP2 can be added during this operation.

For each point in which the system determines that an unconstrained IK solution is available for the toolpaths, a point along a main toolpath is generated (410), and the process iterates through (406)-(408).

For each point in which the system determines that an unconstrained IK solution is not available, the system can proceed to (412) and iteratively constrain the IK solution using available process parameter flexibility (414). Process parameter flexibility can be provided as input to the system by a user in the form of user parameters. Other sources for the parameter flexibility can include their being in the tooltip definition (which can be stored in a separate database for the CAM system) or their being received from a provider of the manufacturing system (provided the format matches what the CAM system is expecting).

In the case that the system determines that a constrained IK solution is available for the point, the process proceeds to (410) and generates a main toolpath point. At (411) the system determines if all the points of TP1 and TP2 are determined. In the case that the system determines that not all the points of TP1 and TP2 are determined, the process iterates to (406), for each point in TP1 and TP2. In the case that the system determines at (411) that a last point of TP1 and TP2 for which a main toolpath point is successfully generated at (410), a solution (e.g., main toolpath for a computer-controlled tool including metadata) is provided as output, e.g., to a CAD/CAM simulation.

Figure 5:
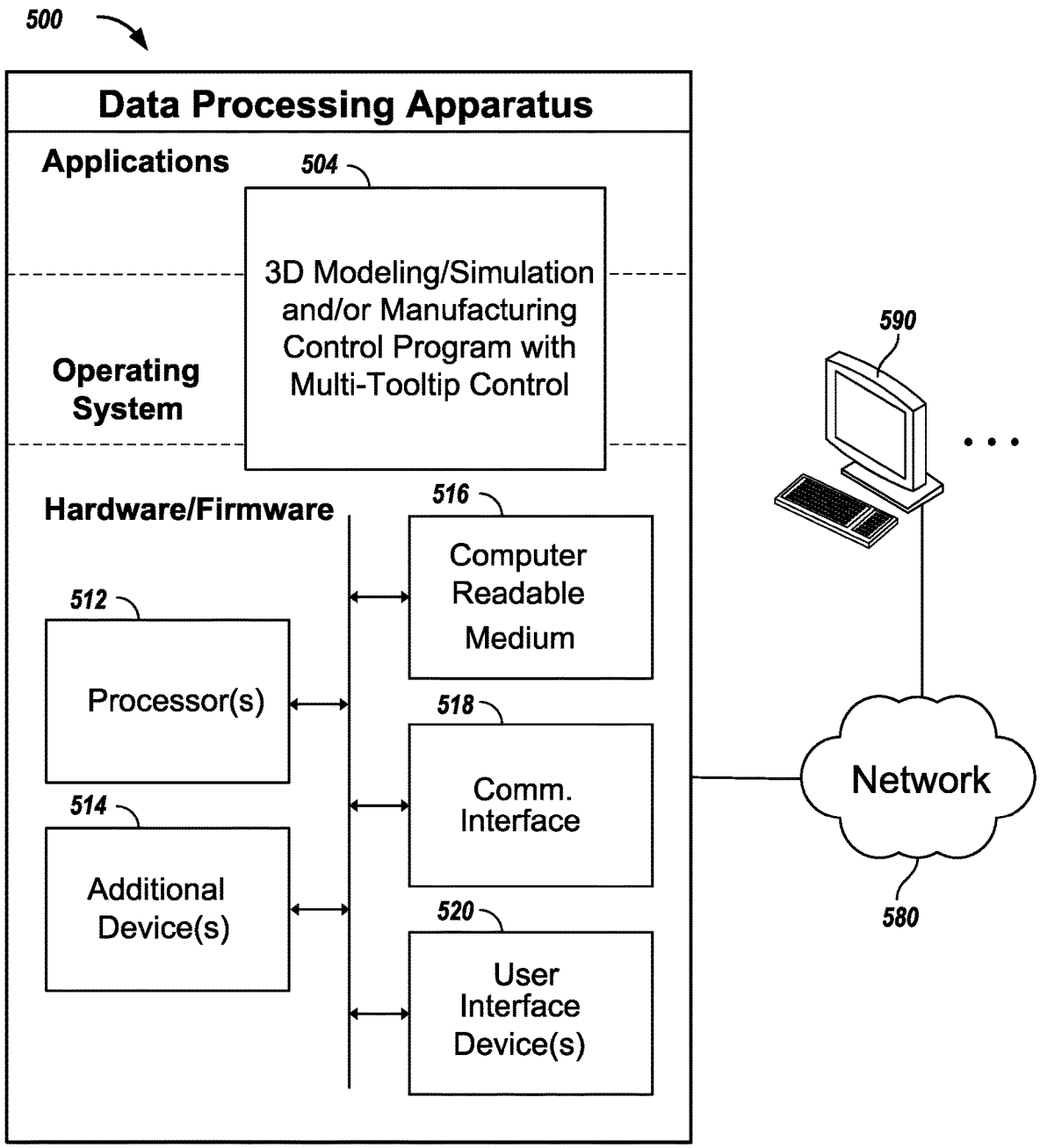
FIG. 5 is a schematic diagram of a data processing system usable to implement the described systems and techniques.

FIG. 5 is a schematic diagram of a data processing system including a data processing apparatus 500, which can be programmed as a client or as a server. The data processing apparatus 500 is connected with one or more computers 590 through a network 580. While only one computer is shown in FIG. 5 as the data processing apparatus 500, multiple computers can be used. The data processing apparatus 500 includes various software modules, which can be distributed between an applications layer and an operating system. These can include executable and/or interpretable software programs or libraries, including tools and services of a 3D modeling/simulation and/or manufacturing control program 504 with multi-tooltip control that implements the systems and techniques described above. The number of software modules used can vary from one implementation to another. Moreover, the software modules can be distributed on one or more data processing apparatus connected by one or more computer networks or other suitable communication networks.

The data processing apparatus 500 also includes hardware or firmware devices including one or more processors 512, one or more additional devices 514, a computer readable medium 516, a communication interface 518, and one or more user interface devices 520. Each processor 512 is capable of processing instructions for execution within the data processing apparatus 500. In some implementations, the processor 512 is a single or multi-threaded processor. Each processor 512 is capable of processing instructions stored on the computer readable medium 516 or on a storage device such as one of the additional devices 514. The data processing apparatus 500 uses the communication interface 518 to communicate with one or more computers 590, for example, over the network 580. Examples of user interface devices 520 include; a display; camera; speaker; microphone; tactile feedback device; keyboard; mouse; and VR and/or AR equipment. The data processing apparatus 500 can store instructions that implement operations associated with the program(s) described above, for example, on the computer readable medium 516 or one or more additional devices 514, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions, and one or more memory devices for storing instructions and data. Generally, a computer will also include, or be operatively coupled to receive data from, or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including: semiconductor memory devices (e.g., Erasable Programmable Read-Only Memory (EPROM) and Electrically Erasable Programmable Read-Only Memory (EEPROM); flash memory devices; magnetic disks (e.g., internal hard disks or removable disks); magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a liquid crystal display (LCD), an organic light emitting diode (OLED), or another monitor for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., a data server, or that includes a middleware component, e.g., an application server, or that includes a front-end component, e.g., a client computer having a graphical user interface or a web browser through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately, or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims.

What is claimed is:

1. A computer-implemented method comprising:
    obtaining two or more toolpaths for manufacturing a physical structure and process control constraints, wherein each of the two or more toolpaths corresponds to a respective tooltip of two or more tooltips of a computer-controlled tool of a computer-controlled manufacturing system, each of the two or more toolpaths designates a respective path for the respective tooltip of the computer-controlled tool within a workspace of the computer-controlled manufacturing system, and the process control constraints define capabilities of each of the respective tooltips within the workspace of the computer-controlled manufacturing system;
    defining a main toolpath and metadata for the main toolpath, wherein defining the metadata comprises defining, at each location of a plurality of locations along the main toolpath, operational parameters for at least one of the respective tooltips corresponding to the two or more toolpaths based on the process control constraints for the respective tooltips at the location, and wherein defining the main toolpath comprises
        selecting one of the two or more toolpaths to be the main toolpath based on the process control constraints for each of the tooltips and the physical structure to be manufactured, or
        generating the main toolpath based on the two or more toolpaths and the process control constraints for each of the tooltips and the physical structure to be manufactured;
    simulating manufacturing of the physical structure by the computer-controlled tool using the main toolpath and the metadata; and
    providing, responsive to a completion of the simulating, at least the main toolpath and the metadata which are usable by the computer-controlled manufacturing system to manufacture the physical structure from the main toolpath and the metadata.

2. The method of claim 1, wherein providing the main toolpath and the metadata for use in manufacturing the physical structure by the computer-controlled manufacturing system comprises:
    generating manufacturing machine instructions from the main toolpath and the metadata; and
    providing, to the computer-controlled manufacturing system, the manufacturing machine instructions.

3. The method of claim 1, wherein obtaining two or more toolpaths for manufacturing the physical structure comprises generating the two or more toolpaths from a 3D model of the physical structure to be manufactured.

4. The method of claim 1, wherein obtaining the process control constraints comprises:
    obtaining, for each of the tooltips, one or more values defining starting/stopping rates, flow rates, or manufacturing rates of the tooltip.

5. The method of claim 4, wherein the metadata defines control information for motion of a tooltip relative to the computer-controlled tool and operation of the tooltip along the main toolpath and according to the one or more values defining starting/stopping rates, flow rates, or manufacturing rates of the tooltip.

6. The method of claim 5, wherein defining the metadata comprises, for at least one tooltip of the tooltips:
    assigning, to the tooltip, an initial location and orientation relative to a tool vector of the computer-controlled tool; and
    generating, for multiple locations along the main toolpath, one or more of a time shift, point shift, or layer shift for the tooltip relative to the main toolpath.

7. The method of claim 1, wherein the computer-controlled tool is a robotic arm, and the two or more tooltips comprise two or more end effectors.

8. The method of claim 1, wherein the two or more toolpaths comprise a first toolpath for a first tooltip and a second, phase-shifted toolpath for a second tooltip.

9. The method of claim 8, wherein at least a first portion of the first toolpath for the first tooltip is different from a second portion of the second, phase-shifted toolpath for the second tooltip.

10. The method of claim 8, wherein obtaining two or more toolpaths for manufacturing a physical structure comprises obtaining a third toolpath for a third tooltip, wherein the third toolpath is in a fixed position with respect to the main toolpath of the computer-controlled tool.

11. A system comprising:
a data processing apparatus including at least one hardware processor; and
a non-transitory computer-readable medium encoding instructions of a computer-aided design program, the instructions being configured to cause the data processing apparatus to
obtain two or more toolpaths for manufacturing a physical structure and process control constraints, wherein each of the two or more toolpaths corresponds to a respective tooltip of two or more tooltips of a computer-controlled tool of a computer-controlled manufacturing system, each of the two or more toolpaths designates a respective path for the respective tooltip of the computer-controlled tool within a workspace of the computer-controlled manufacturing system, and the process control constraints define capabilities of each of the respective tooltips within the workspace of the computer-controlled manufacturing system,
define a main toolpath and metadata for the main toolpath, wherein defining the metadata comprises defining, at each location of a plurality of locations along the main toolpath, operational parameters for at least one of the respective tooltips corresponding to the two or more toolpaths based on the process control constraints for the respective tooltips at the location, and wherein defining the main toolpath comprises
selecting one of the two or more toolpaths to be the main toolpath based on the process control constraints for each of the tooltips and the physical structure to be manufactured, or
generating the main toolpath based on the two or more toolpaths and the process control constraints for each of the tooltips and the physical structure to be manufactured,
simulate manufacturing of the physical structure by the computer-controlled tool using the main toolpath and the metadata, and
provide, responsive to a completion of the simulating, at least the main toolpath and the metadata which are usable by the computer-controlled manufacturing system to manufacture the physical structure from the main toolpath and the metadata.

12. The system of claim 11, wherein the instructions are configured to cause the data processing apparatus to obtain the process control constraints by obtaining, for each of the tooltips, one or more values defining starting/stopping rates, flow rates, or manufacturing rates of the tooltip.

13. The system of claim 12, wherein the metadata defines control information for motion of a tooltip relative to the computer-controlled tool and operation of the tooltip along the main toolpath and according to the one or more values defining starting/stopping rates, flow rates, or manufacturing rates of the tooltip.

14. The system of claim 13, wherein the instructions are configured to cause the data processing apparatus to define the metadata by, for at least one tooltip of the tooltips:
assigning, to the tooltip, an initial location and orientation relative to a tool vector of the computer-controlled tool; and
generating, for multiple locations along the main toolpath, one or more of a time shift, point shift, or layer shift for the tooltip relative to the main toolpath.

15. The system of claim 11, wherein the computer-controlled tool is a robotic arm, and the two or more tooltips comprise two or more end effectors.

16. The system of claim 11, wherein the two or more toolpaths comprise a first toolpath for a first tooltip and a second, phase-shifted toolpath for a second tooltip.

17. The system of claim 16, wherein at least a first portion of the first toolpath for the first tooltip is different from a second portion of the second, phase-shifted toolpath for the second tooltip.

18. A non-transitory computer-readable medium encoding instructions operable to cause data processing apparatus to perform operations comprising:
obtaining two or more toolpaths for manufacturing a physical structure and process control constraints, wherein each of the two or more toolpaths corresponds to a respective tooltip of two or more tooltips of a computer-controlled tool of a computer-controlled manufacturing system, each of the two or more toolpaths designates a respective path for the respective tooltip of the computer-controlled tool within a workspace of the computer-controlled manufacturing system, and the process control constraints define capabilities of each of the respective tooltips within the workspace of the computer-controlled manufacturing system;
defining a main toolpath and metadata for the main toolpath, wherein defining the metadata comprises defining, at each location of a plurality of locations along the main toolpath, operational parameters for at least one of the respective tooltips corresponding to the two or more toolpaths based on the process control constraints for the respective tooltips at the location, and wherein defining the main toolpath comprises
selecting one of the two or more toolpaths to be the main toolpath based on the process control constraints for each of the tooltips and the physical structure to be manufactured, or
generating the main toolpath based on the two or more toolpaths and the process control constraints for each of the tooltips and the physical structure to be manufactured;
simulating manufacturing of the physical structure by the computer-controlled tool using the main toolpath and the metadata; and
providing, responsive to a completion of the simulating, at least the main toolpath and the metadata which are usable by the computer-controlled manufacturing system to manufacture the physical structure from the main toolpath and the metadata.

19. The non-transitory computer-readable medium of claim 18, wherein obtaining the process control constraints comprises:
obtaining, for each of the tooltips, one or more values defining starting/stopping rates, flow rates, or manufacturing rates of the tooltip.

20. The non-transitory computer-readable medium of claim 19, wherein the metadata defines control information for motion of a tooltip relative to the computer-controlled tool and operation of the tooltip along the main toolpath and according to the one or more values defining starting/stopping rates, flow rates, or manufacturing rates of the tooltip.

21. The non-transitory computer-readable medium of claim 20, wherein defining the metadata comprises, for at least one tooltip of the tooltips:
assigning, to the tooltip, an initial location and orientation relative to a tool vector of the computer-controlled tool; and
generating, for multiple locations along the main toolpath, one or more of a time shift, point shift, or layer shift for the tooltip relative to the main toolpath.

22. The non-transitory computer-readable medium of claim 18, wherein the two or more toolpaths comprise a first toolpath for a first tooltip and a second, phase-shifted toolpath for a second tooltip.

23. The non-transitory computer-readable medium of claim 22, wherein at least a first portion of the first toolpath for the first tooltip is different from a second portion of the second, phase-shifted toolpath for the second tooltip.

24. The non-transitory computer-readable medium of claim 22, wherein obtaining two or more toolpaths for manufacturing a physical structure comprises obtaining a third toolpath for a third tooltip, wherein the third toolpath is in a fixed position with respect to the main toolpath of the computer-controlled tool.

\* \* \* \* \*